Nov. 3, 1959   M. PAROS   2,911,025
COMBINATION CHRISTMAS TREE COVER AND NEEDLE CATCHER
Filed May 15, 1958
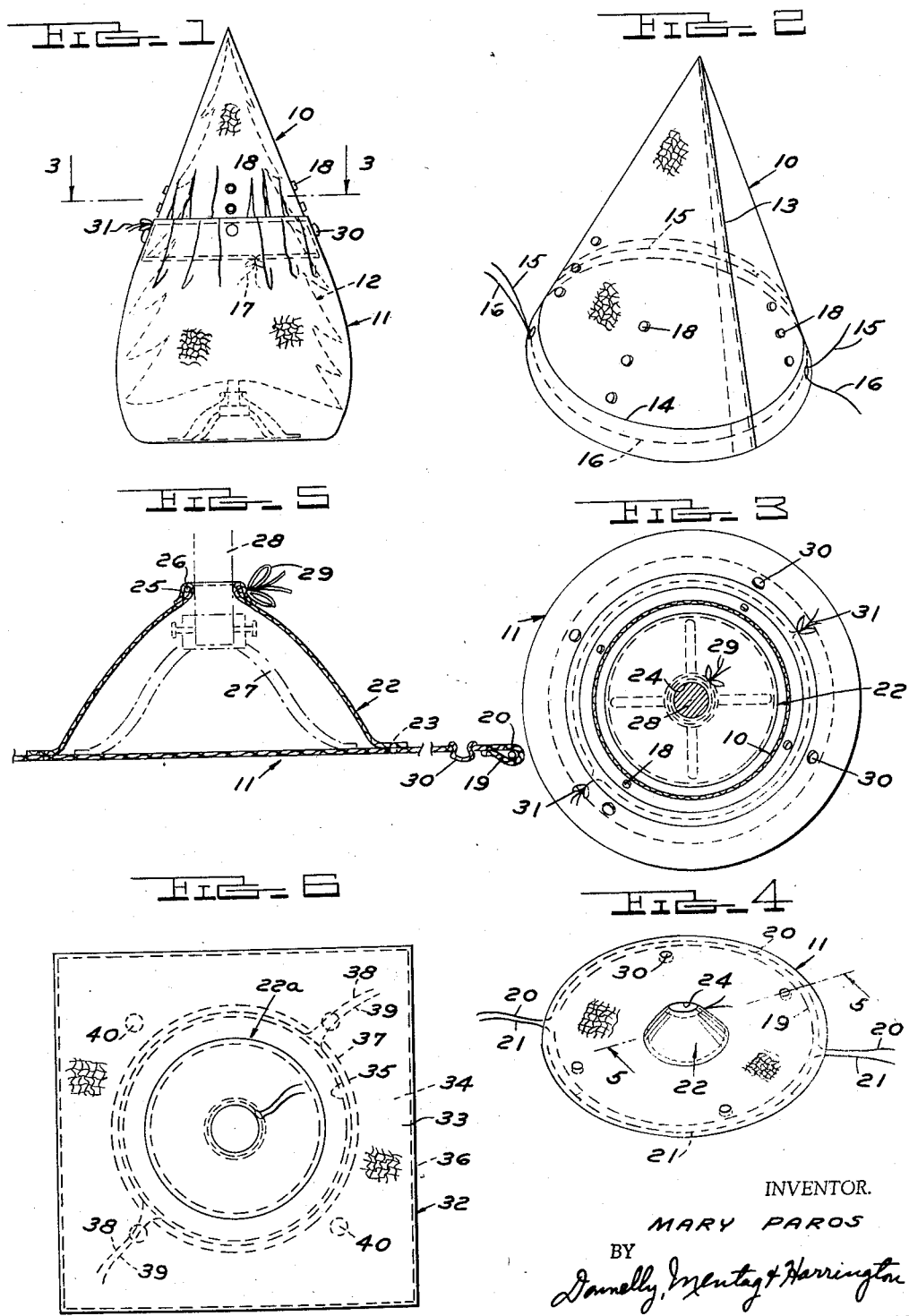
INVENTOR.
MARY PAROS
BY
Donnelly, Mentag & Harrington
ATTORNEYS

United States Patent Office 2,911,025
Patented Nov. 3, 1959

2,911,025

COMBINATION CHRISTMAS TREE COVER AND NEEDLE CATCHER

Mary Paros, Livonia, Mich., assignor of one-half to John Zelepis, Livonia, Mich.

Application May 15, 1958, Serial No. 735,610

5 Claims. (Cl. 150—52)

This invention relates generally to a covering for Christmas trees and, more particularly, to a combination Christmas tree covering and needle catcher. When a Christmas tree is carried either in or out of a house, the branches thereof tend to shed needles and especially when the tree is bumped against door jambs and so forth. Accordingly, it is the primary object of this invention to provide a Christmas tree covering or bag which may be easily and quickly mounted on a Christmas tree when the tree is either taken in or out of the house whereby any needles falling from the tree will be caught in the covering.

It is another object of this invention to provide a Christmas tree covering which is made from a suitable pliable material and which comprises an upper and lower part and wherein the lower part is adapted to also serve as a floor covering around and under the tree during the time the tree is in the house so as to catch any falling needles. The covering parts may be colored as desired or provided with any desired decorations or designs whereby the lower cover part may also be decorative as well as functional.

It is still another object of the invention to provide a Christmas tree covering and needle catcher which is compact and simple in construction, pleasing in appearance, economical of manufacture and efficient in operation.

Other objects, features and advantages of this invention will be apparent from the following detailed description and appended claims, reference being had to the accompanying drawing forming a part of the specification wherein like reference numerals designate corresponding parts of the several views.

In the drawing:

Fig. 1 is a side elevational view of a combination Christmas tree cover and needle catcher made in accordance with the principles of the invention;

Fig. 2 is an enlarged perspective view of the upper conically shaped cover part of the structure illustrated in Fig. 1;

Fig. 3 is an enlarged horizontal plan view, partly in section, of the structure illustrated in Fig. 1, taken along the line 3—3 thereof, and looking in the direction of the arrows;

Fig. 4 is a reduced perspective view of the lower cover part of the structure illustrated in Fig. 1, and showing this cover part spread out in an operative position to catch needles;

Fig. 5 is an enlarged, partial, broken, elevational sectional view of the structure illustrated in Fig. 4, taken substantially along the lines 5—5 thereof, and showing the lower end of a Christmas tree in dash-dot lines; and, Fig. 6 is an upper plan view of a second embodiment of the lower cover part of the tree cover of the present invention.

Referring now to Fig. 1 of the drawing wherein is shown an illustrative embodiment of the invention, the numeral 10 generally designates the upper cover part of the tree bag or covering and the numeral 11 generally designates the lower cover part of the tree cover. The cover parts 10 and 11 are shown in an operative tree covering position about a tree shown in dash-dot lines and generally indicated by the numeral 12. The cover parts 10 and 11 may be made from any suitable pliable material, such as, a lightweight cotton or nylon, canvas, paper, or plastic. The cover parts 10 and 11 may be made colored as desired or provided with any desired decorations or designs.

As shown in Fig. 2, the upper cover part 10 is preferably conically shaped and is formed from a single piece of material with the edges thereof being joined by any suitable means along the seam line indicated by the numeral 13. It will be obvious, however, that the upper cover part 10 may be made from a plurality of parts and that the upper end does not necessarily have to be pointed. The bottom end of the upper cover part 10 is provided with a peripheral seam 14 formed by folding the ends over and stitching them in place. Operatively mounted in the hem 14 are two drawstrings generally indicated by the numerals 15 and 16 and which are adapted to have the ends thereof extend outwardly through suitable apertures at diametrically oppositely disposed positions as shown in Fig. 2. In use, the upper cover part 10 is disposed around the top of a Christmas tree as shown in Fig. 1 and the drawstrings are used to secure the bottom end of this cover part around the tree in snug engagement therewith. The drawstrings 15 and 16 would function in the usual manner and the ends thereof would be tied in a bow-knot as indicated by the numeral 17 in Fig. 1. The upper cover part 10 is provided with a plurality of male snap portions 18 preferably at four points spaced around the lower end thereof and the function of these snap portions will be more fully explained hereinafter.

As shown in Figs. 1, 3, 4 and 5, the lower cover part 11 is preferably circular in shape and is provided with a peripheral hem 19 in which is operatively mounted the drawstrings 20 and 21. Centrally mounted on the upper side of the cover part 11 is a tree stand circular cover portion generally indicated by the numeral 22 and this part is preferably made from the same material as the cover parts 10 and 11. As shown in Fig. 5, the tree stand cover portion 22 may be secured to the cover part 11 by any suitable means as by stitching, as indicated by the numeral 23. The portion 22 is provided with a central circular aperture or hole 24 which is preferably made to a size large enough to permit the insertion therethrough of a Christmas tree stand as indicated by the numeral 27. The edges of the cover portion 22 around the hole 24 are folded back to form the hem 25 in which is operatively mounted the drawstring 26. As best seen in Fig. 5, the drawstring 26 is used to draw the cover portion 22 snugly around the tree stump 28 and the ends thereof are tied in the usual bow-knot as indicated by the numeral 29. The lower cover part 11 is provided with a plurality of female snap portions 30.

In use, the upper cover part 10 would be mounted over the upper end of a Christmas tree as described hereinbefore and as shown in Fig. 1. The lower cover part 11 is then mounted on the lower end of the Christmas tree in the manner described hereinbefore and as shown in Fig. 5. The lower cover part is then brought upward around the lower part of the tree and the female snap portions 30 are snapped onto the adjacently disposed male snap portions 18 on the upper cover part 10. The drawstrings 20 and 21 are then used to secure the upper end of the lower cover part around the tree in snug engagement therewith and in overlapping engagement with the upper cover part and the ends thereof are tied in bow-knots as indicated by the numeral 31 in Fig. 1. It will be seen that the snap portions 18 and 30 provide a means whereby a single person may quickly and easily mount a covering of the present invention on a tree. A plurality of male snap portions 18 is provided in vertical alignment at preferably four points around the cover whereby a single cover may serve to cover trees of various heights. As shown in Fig. 1, the bottom end of the upper cover part is overlapped by the top end of the lower cover part whereby any needles shed by the tree when the covering is mounted on the tree will fall into the lower cover part. Fig. 4 shows the lower cover part as spread out and in the position it assumes under the tree when it functions as a needle catcher.

Fig. 6 shows a second embodiment of a lower cover part which is indicated generally by the numeral 32. The lower cover part 32 is square shaped and is made from the same material as the cover parts 10 and 11. The cover part 32 comprises a top square portion 33 and a bottom square portion 34 which is provided with a central aperture or hole 35. The portions 33 and 35 are suitably fixed together along the outer edges thereof as by the seam 36. The lower cover part 32 is shown in Fig. 6 in the position it would be used in when serving under the tree as a needle catcher and in a position corresponding to the position that the first lower cover part 11 is functioning in as shown in Fig. 4. The lower cover part 32 is provided with a tree stand circular cover portion on the upper face of the top portion 33 and is generally designated by the numeral 22a. The tree stand cover portion 22a is similar in structure and function to the aforedescribed tree stand cover 22. The edges of the bottom portion around the aperture 35 are folded over to provide the hem 37 in which is operatively mounted the drawstrings 38 and 39. A plurality of female snap portions 40 are mounted on the bottom portion 34. In use, the lower cover part 32 functions in the same manner as the lower cover part 11. When the lower cover part 32 is brought upwardly around the lower end of a tree, the bottom portion 34 is folded out and around the top portion 33 and the drawstrings 38 and 39 and the female snap portions 40 function in the same manner as the drawstrings 20 and 21 and the female snap portions 30 of the lower cover part 11.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A Christmas tree covering of the class described comprising: an upper cover part of a pliable material having a closed top end and an open bottom end; said upper cover part being adapted to be disposed over the upper end of a Christmas tree; means on the bottom end of said upper cover part for securing the same around the tree in snug engagement therewith; a lower cover part of a pliable material adapted to be disposed under the tree and to extend upwardly around the tree and to overlap the bottom end of the upper cover part; and, means on the lower cover part for securing the same around the tree in snug engagement therewith.

2. A Christmas tree covering of the class described comprising: an upper cover part of a pliable material having a closed top end and an open bottom end; said upper cover part being adapted to be disposed over the upper end of a Christmas tree; means on the bottom end of said upper cover part for securing the same around the tree in snug engagement therewith; a lower cover part of a pliable material adapted to be disposed under the tree and to extend upwardly around the tree and to overlap the bottom end of the upper cover part; means for detachably connecting said cover parts together; and, means on the lower cover part for securing the same around the tree in snug engagement therewith.

3. A Christmas tree covering of the class described comprising: an upper cover part of a pliable material having a closed top end and an open bottom end; said upper cover part being adapted to be disposed over the upper end of a Christmas tree; means on the bottom end of said upper cover part for securing the same around the tree in snug engagement therewith; a lower cover part of a pliable material adapted to be disposed under the tree and to extend upwardly around the tree and to overlap the bottom end of the upper cover part; said lower cover part including a tree stand cover portion mounted on the inner upper surface of the lower cover part for engagement around the lower end of the tree stump; means for detachably connecting said cover parts together; and, means on the lower cover part for securing the same around the tree in snug engagement therewith.

4. The structure as defined in claim 3, wherein: said lower cover part is circularly shaped when in a flat inoperative covering position.

5. The structure as defined in claim 3, wherein: said lower cover part is square shaped when in a flat inoperative covering position.

References Cited in the file of this patent

UNITED STATES PATENTS

| | | |
|---|---|---|
| 1,082,862 | Geschickter | Dec. 30, 1913 |
| 2,445,487 | Lester et al. | July 20, 1948 |
| 2,691,998 | Stucker | Oct. 19, 1954 |
| 2,781,811 | Dilar et al. | Feb. 19, 1957 |

FOREIGN PATENTS

| | | |
|---|---|---|
| 496,156 | Great Britain | Nov. 25, 1938 |